Patented Jan. 7, 1936

2,026,840

UNITED STATES PATENT OFFICE 2,026,840

PRODUCTION OF CARBON BISULPHIDE

Michael J. Leahy, Fort Worth, Tex.

No Drawing. Application March 20, 1934,
Serial No. 716,551

15 Claims. (Cl. 23—206)

This invention relates to producing relatively pure carbon bisulphide from sulphur and carbon or charcoal.

Carbon bisulphide is ordinarily produced by passing an electric current through a column of wood charcoal and lump brimstone. The electric current melts the sulphur which is then vaporized and the sulphur vapor, rising through the column of charcoal and sulphur, reacts with the carbon of the charcoal at red heat to form carbon bisulphide which is then cooled to a liquid.

The retorts in which this reaction occurs must be vertical so that the molten sulphur will form a pool around the electrodes, and the solid materials will settle by gravity to the vicinity of the electrodes. The charcoal and the sulphur used must be in the form of lumps so that the gases formed during the reaction will pass through the column containing the charcoal and sulphur without excessive resistance.

Another process that is being used to some extent comprises melting and vaporizing sulphur in a separate container, passing the sulphur vapors through a superheater and then forcing the superheated vapors upward through a column of lump coke or charcoal maintained at a red heat. The gaseous products of the reaction are condensed and the carbon bisulphide is recovered. Better results are claimed for this process because it is claimed that the reaction temperature may be controlled more accurately by controlling the temperature of the superheated sulphur vapors. However, the coke or wood charcoal used in this process must be in lump form to permit the passage of gases through the column.

In either of the above named processes, hard clinkers of carbon and sulphur are apt to form in the cooler parts of the column; the sulphur is apt to condense in the upper parts of the column and thus greatly increase the resistance of the column to the passage of the gases formed; and the sulphur and carbon in the retorts cannot be accurately maintained in the proper proportions. Consequently, much sulphur dissolves in the carbon bisulphide during condensation and this dissolved sulphur must be removed from the raw carbon bisulphide liquid in order to purify such liquid.

It is an object of my invention to provide a process in which the carbon or charcoal and the sulphur used for making carbon bisulphide may be accurately and controllably proportioned prior to admission into the reaction chamber.

It is a further object of my invention to utilize some of the vast quantities of the elements which enter into the making of carbon bisulphide that are now going to waste daily. For example, vast volumes of natural gas, and refinery-still gases, which contain varying amounts of hydrogen sulphide gas are being wasted into the air daily because carbon black of good quality may not be made economically from such gases. Further, the hydrogen sulphide content of such gases prohibits their utilization for domestic fuel purposes.

It is a further object of my invention to produce carbon bisulphide of a high degree of purity without repeated rectification.

It is a further object of my invention to utilize waste materials such as coke "breeze", petroleum coke, pulverized wood charcoal and impure sulphur in the making of carbon bisulphide.

It is a further object of my invention to provide a process in which the reaction between carbon and sulphur to produce carbon bisulphide proceeds at relatively low temperatures.

Further objects of my invention will be made clear from a study of the following description of illustrative examples of the use of my invention:

Example I

Carbon in the form of powdered coke, petroleum coke, pulverized wood charcoal, or carbon black is mixed with sulphur in approximately molal proportions (12 lbs. C and 64 lbs. S) and the mixture is heated in a container in the absence of air or other oxygen-releasing fluid or solid to a temperature sufficiently high to complete the formation of carbon bisulphide, but not so high as to cause its dissociation into its elements (350° F. to 1,000° F.). The gaseous carbon bisulphide so formed is then condensed to a liquid. The process may be made continuous by providing means for charging fresh supplies of the mixture of carbon and sulphur into the reaction chamber.

In order to carry on the said reaction at a lower temperature than would otherwise be required, I may cause the said reaction to occur in the presence of catalysts such as platinum, platinum black or other platinum compounds; or vanadium or manganese compounds which do not release large quantities of oxygen under the conditions of temperature and reaction prevailing in the said reaction chamber. Such catalysts may be incorporated with the said carbon and sulphur during the mixing of these materials; or the catalysts may be introduced into the reaction chamber separately.

In order to provide for more economical handling and utilization of the materials, I may incorporate carbon bisulphide with the carbon and sulphur during the mixing period. Such carbon bisulphide liquid may be obtained from the residual liquid remaining after the rectification of raw carbon bisulphide.

By the use of this method waste, or cheap carbon-containing materials such as coke "breeze", petroleum coke, wood charcoal dust, or low-grade carbon black may be utilized to advantage.

Example II

Carbon in finely divided form is mixed with carbon bisulphide liquor which has previously been passed over sulphur or sulphur-yielding compounds in order to dissolve as much sulphur as practical in such carbon bisulphide liquor. The resulting mixture is then heated in a container in the absence of air or oxygen-releasing compounds, with or without the aid of suitable catalysts. The gaseous carbon bisulphide formed by the vaporization of the raw liquor and by the interaction of carbon and sulphur may be condensed and rectified. If rectified, the residual liquor may be used for extracting more sulphur from the crude sulphur or sulphur-releasing compounds and the liquor may then be mixed with more carbon. Such mixture may be introduced continuously in regulated amounts into the reaction chamber. Thus the process may be made continuous and cyclic in character.

By the use of this described method, waste materials containing carbon and sulphur which contains impurities that are insoluble in carbon bisulphide may be utilized advantageously.

Example III

Finely divided carbon in the form of carbon black ordinarily obtained from the incomplete combustion of fuel gases and finely divided sulphur obtained by the removal of hydrogen sulphide from fuel gases containing it as an impurity and the conversion of such hydrogen sulphide to free sulphur are mixed and the mixture is heated in a container in the absence of air or oxygen-releasing substances, and the resulting vapors are condensed to form liquid carbon bisulphide. Suitable catalysts may be used to promote the said reaction at a lower temperature than is ordinarily required.

Further, on account of the extreme fineness of the said carbon black and of some, or all, of the sulphur used in this method, it is desirable to incorporate at least enough carbon bisulphide liquid, or liquor, into the mixture to provide for economical and safe handling of such mixture prior to its introduction into the reaction chamber.

One manner in which I propose to use this method is by removing hydrogen sulphide from natural gas, refinery-still gases, or other fuel gases containing such impurity and converting such hydrogen sulphide to free sulphur by any suitable means; but preferably by the use of the processes and/or apparatus described and claimed in my U. S. Letters Patent No. 1,800,892, U. S. Letters Patent No. 1,812,795 and my copending application for U. S. Letters Patent, Serial No. 680,149, filed July 12, 1933. The fuel gas, or a portion thereof, may be incompletely burned to produce carbon black in the desired quantities. Such free sulphur and such carbon black may be mixed in the proper proportions and such mixture converted to carbon bisulphide in the manner previously described in this specification.

Since the sulphur and carbon black produced as described are each finely divided and are very chemically active, their combination chemically to produce carbon bisulphide proceeds at much lower temperatures than is required when ordinary sulphur and ordinary carbon are used. However, I may use suitable catalysts to promote the said reaction at still lower temperatures, if desired.

It is understood that the term "finely divided carbon" as employed in this specification and in the appended claims is made to include: finely divided coke which may be in the form of mechanically ground coke, coke screenings, coke "breeze", coke dust, etc.; petroleum coke defined as coke obtained from liquid or solid hydrocarbons; carbon black, lampblack, or decolorizing carbon; finely divided wood charcoal or bone charcoal; amorphous carbon defined as the carbon obtained from the destructive distillation of carbohydrates such as straw, stalks, bagasse, cotton fibres, etc.; or mixtures of two or more forms of such carbon.

It is also understood that the term "finely divided sulphur" as employed in this specification and in the appended claims is made to include: mechanically ground sulphur, sulphur screenings, sulphur flour, etc.; sublimed sulphur and flowers of sulphur; sulphur precipitated from any chemical containing sulphur and such precipitated sulphur may be in the form of lumps or masses that disintegrate readily when dry; colloidal sulphur formed as a product of those chemical reactions that leave the sulphur in an extremely finely divided state; or mixtures of two or more of the said forms of sulphur.

It is likewise understood that the term "heavy sulphur" as employed in this specification and in the appended claims is made to include: mined sulphur, brimstone sulphur, or sulphur as extracted from sulphur-bearing material by the aid of liquid carbon bisulphide; or mixtures of two or more of the said forms of sulphur.

It is further understood that the term "carbon bisulphide liquid" as employed in this specification and in the appended claims is made to include: substantially pure carbon bisulphide liquid; residual carbon bisulphide liquors or those liquors remaining in a rectifier after the distillation and rectification of carbon bisulphide; raw carbon bisulphide liquid or the condensed, but unrectified, carbon bisulphide vapors; or mixtures of two or more forms of such liquid carbon bisulphide.

It is further understood that the term "sulphurizing catalyst" as employed in this specification and in the appended claims is made to include: platinum or normally solid platinum compounds; vanadium or normally solid vanadium compounds; nickel or normally solid nickel compounds; molybdenum or normally solid molybdenum compounds; any metallic compounds which have a catalytic effect on the formation of sulphur compounds; or mixtures of two or more of the said catalysts.

Having thus described my invention by the aid of illustrative examples and the said definitions, it is understood that I do not limit the scope of my invention to such illustrative examples; but may use any suitable combination of the said defined materials within the scope of the appended claims without departing from the spirit of the invention.

I claim:

1. A process for producing carbon bisulphide which comprises mixing together finely divided carbon, finely divided sulphur and carbon bisulphide liquid and heating such mixture in a container in the absence of free oxygen to a temperature sufficiently high to form carbon bisulphide from such carbon and such sulphur.

2. A process for producing carbon bisulphide which comprises mixing together finely divided carbon, finely divided sulphur and carbon bisulphide liquid and heating such mixture in a container in the presence of a sulphurizing catalyst and in the absence of free oxygen to a temperature sufficiently high to form carbon bisulphide from such carbon and such sulphur.

3. A process for producing carbon bisulphide which comprises dissolving heavy sulphur in carbon bisulphide liquid, mixing finely divided carbon with such liquid and heating such mixture in a container in the absence of free oxygen to a temperature sufficiently high to form carbon bisulphide from such sulphur and such carbon.

4. A process for producing carbon bisulphide which comprises dissolving finely divided sulphur in carbon bisulphide liquid, mixing finely divided carbon with such liquid and heating such mixture in a container in the absence of free oxygen to a temperature sufficiently high to form carbon bisulphide from such sulphur and such carbon.

5. A process for producing carbon bisulphide which comprises dissolving heavy sulphur in carbon bisulphide liquid, mixing finely divided carbon with such liquid and heating such mixture in a container in the presence of a sulphurizing catalyst and in the absence of free oxygen to a temperature sufficiently high to form carbon bisulphide from such sulphur and such carbon.

6. A process for producing carbon bisulphide which comprises dissolving finely divided sulphur in carbon bisulphide liquid, mixing finely divided carbon with such liquid and heating such mixture in a container in the presence of a sulphurizing catalyst and in the absence of free oxygen to a temperature sufficiently high to form carbon bisulphide from such sulphur and such carbon.

7. A process for producing carbon bisulphide which comprises dissolving heavy sulphur in carbon bisulphide liquid, mixing finely divided carbon and finely divided sulphur with such liquid and heating such mixture in a container in the absence of free oxygen to a temperature sufficiently high to form carbon bisulphide from such carbon and such sulphurs.

8. A process for producing carbon bisulphide which comprises dissolving heavy sulphur in carbon bisulphide liquid, mixing finely divided carbon and finely divided sulphur with such liquid and heating such mixture in a container in the presence of a sulphurizing catalyst and in the absence of free oxygen to a temperature sufficiently high to form carbon bisulphide from such carbon and such sulphurs.

9. A process for producing carbon bisulphide which comprises dissolving heavy sulphur and finely divided sulphur in carbon bisulphide liquid, mixing finely divided carbon with such liquid and heating such mixture in a container in the absence of free oxygen to a temperature sufficiently high to form carbon bisulphide from such sulphurs and such carbon.

10. A process for producing carbon bisulphide which comprises dissolving heavy sulphur and finely divided sulphur in carbon bisulphide liquid, mixing finely divided carbon with such liquid and heating such mixture in a container in the presence of a sulphurizing catalyst and in the absence of free oxygen to a temperature sufficiently high to form carbon bisulphide from such sulphurs and such carbon.

11. A process for producing carbon bisulphide which comprises dissolving heavy sulphur in carbon bisulphide liquid, mixing finely divided carbon, further amounts of carbon bisulphide liquid and finely divided sulphur with such liquid and heating such mixture in a container in the absence of free oxygen to a temperature sufficiently high to form carbon bisulphide from such sulphurs and such carbon.

12. A process for producing carbon bisulphide which comprises dissolving heavy sulphur in carbon bisulphide liquid, mixing finely divided carbon, further amounts of carbon bisulphide liquid and finely divided sulphur with such liquid and heating such mixture in a container in the presence of a sulphurizing catalyst and in the absence of free oxygen to a temperature sufficiently high to form carbon bisulphide from such sulphurs and such carbon.

13. A continuous and cyclic process for producing carbon bisulphide which comprises mixing together finely divided carbon, finely divided sulphur and carbon bisulphide liquid, continuously introducing such mixture into a container in the absence of free oxygen, continuously maintaining such container at a temperature sufficiently high to form carbon bisulphide vapors from such carbon and such sulphur, continuously condensing such vapors, and continuously returning a part of such condensed carbon bisulphide liquid to the process for mixing with further quantities of such carbon and such sulphur.

14. A continuous and cyclic process for producing carbon bisulphide which comprises dissolving heavy sulphur in carbon bisulphide liquid, mixing finely divided carbon and finely divided sulphur with such liquid in such proportions that the total carbon and the total free sulphur are present in the mixture in substantially the proper molal proportions for conversion to carbon bisulphide, continuously introducing such mixture into a container from which free oxygen is excluded, continuously maintaining such container at temperatures sufficiently high to form carbon bisulphide vapors from such carbon and such sulphur in the presence or absence of a sulphurizing catalyst, continuously condensing such vapors, and dissolving further amounts of heavy sulphur in a part of such carbon bisulphide liquid so formed to complete the cycle.

15. A continuous and cyclic process for producing carbon bisulphide which comprises mixing together sulphur precipitated from gases containing sulphur compounds with carbon obtained from gaseous compounds of carbon and with residual carbon bisulphide liquors in which heavy sulphur has been dissolved in such proportions that the total free carbon and the total free sulphur are present in such mixture in substantially the proper molal proportions for conversion to carbon bisulphide, continuously introducing such mixture into a container from which free oxygen is excluded, continuously maintaining such container at temperatures suitable for the maximum formation of carbon bisulphide vapors from such carbon and such sulphur either in the presence or absence of a sulphurizing catalyst, continuously rectifying and condensing such vapors, separating residual liquors remaining from such rectification, and dissolving further amounts of heavy sulphur in such liquors to complete the cycle.

MICHAEL J. LEAHY.